No. 855,272. PATENTED MAY 28, 1907.
J. BARNETT.
TAILOR'S MEASURING APPARATUS.
APPLICATION FILED JULY 19, 1906.
3 SHEETS—SHEET 1.
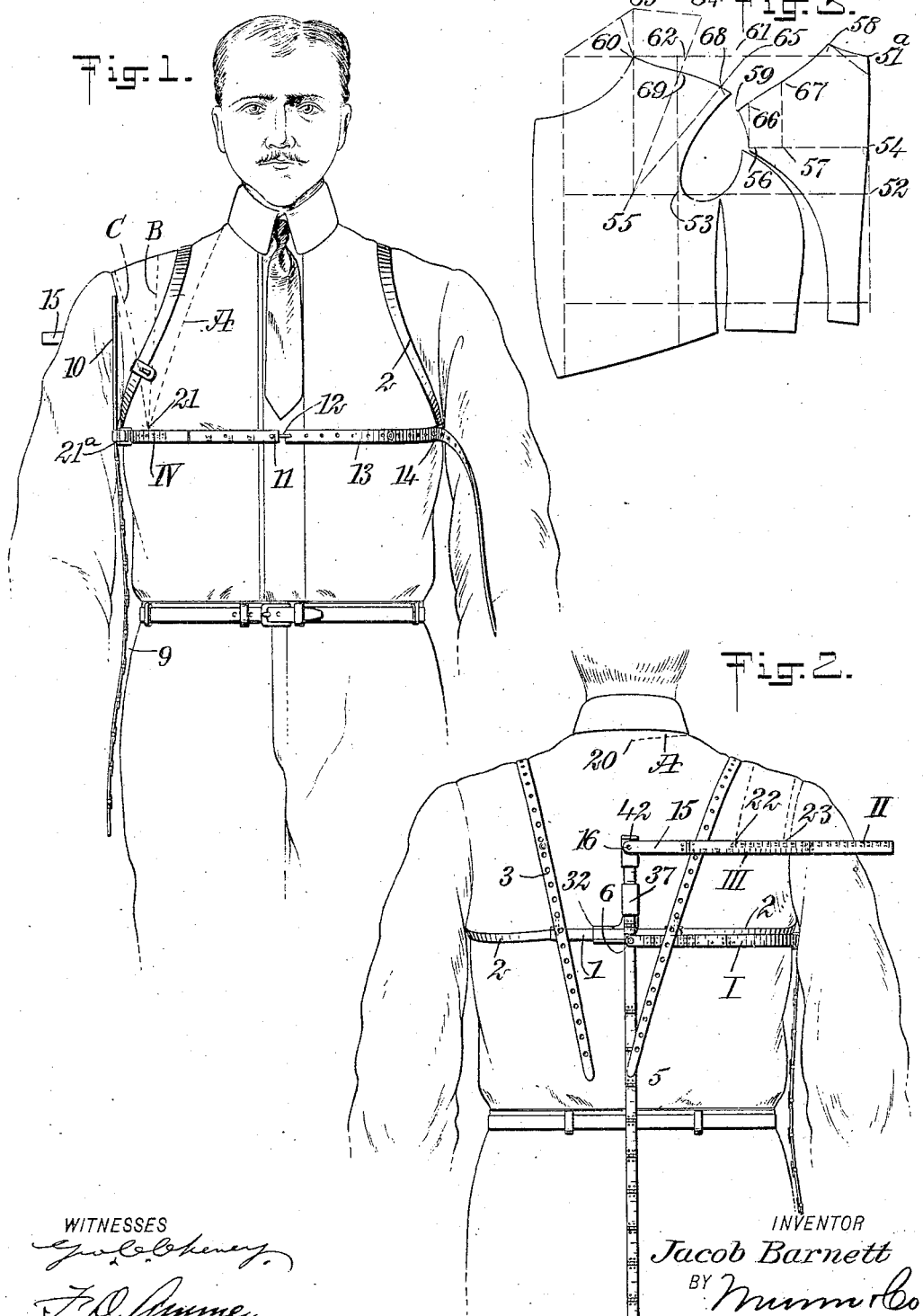
WITNESSES
INVENTOR
Jacob Barnett
BY
ATTORNEYS

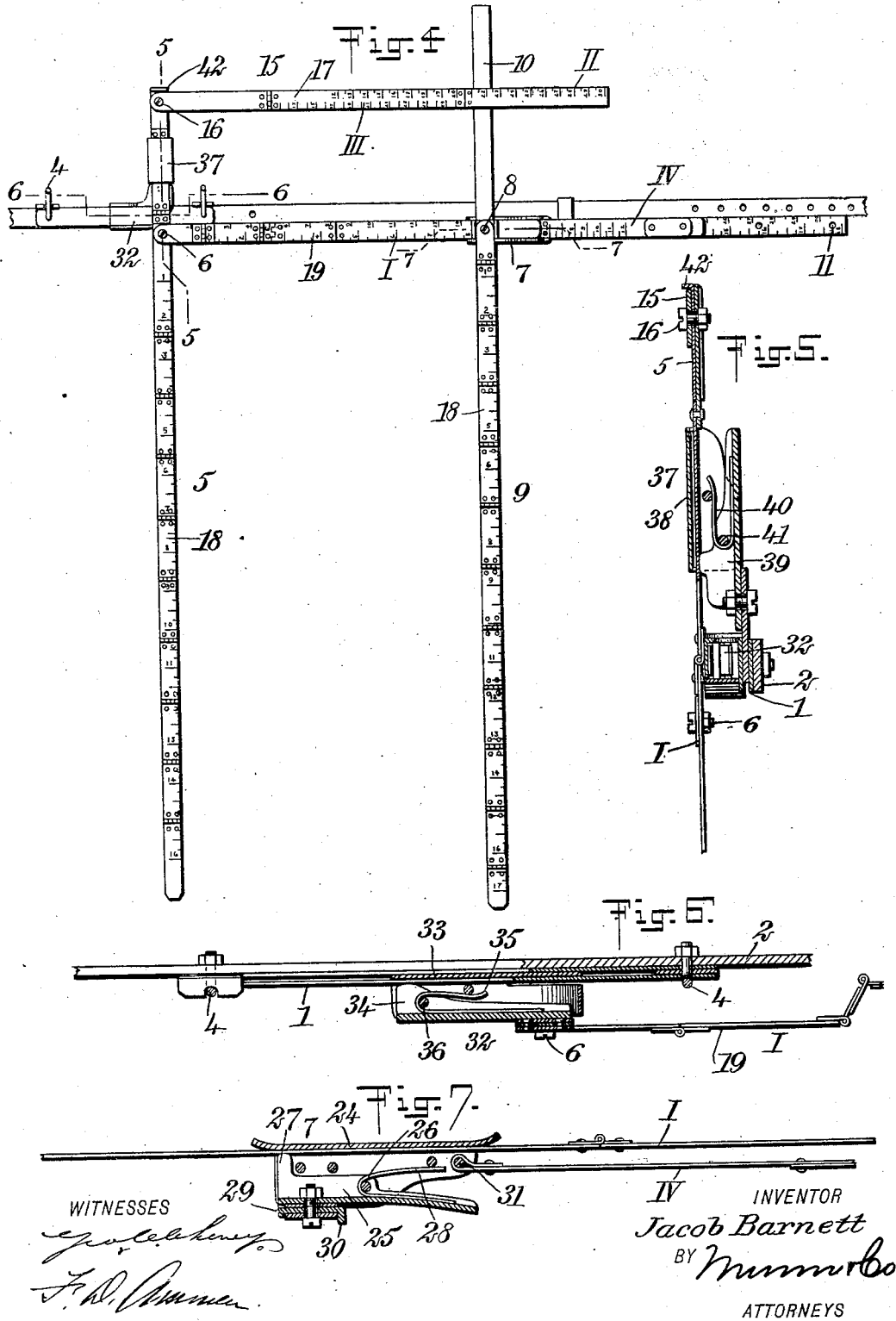

No. 855,272. PATENTED MAY 28, 1907.
J. BARNETT.
TAILOR'S MEASURING APPARATUS.
APPLICATION FILED JULY 19, 1906.
3 SHEETS—SHEET 3.
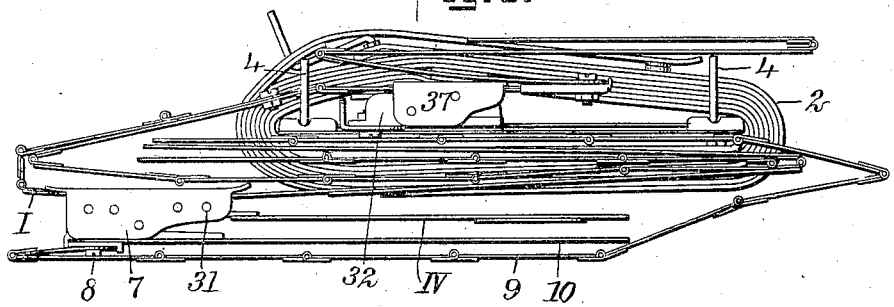
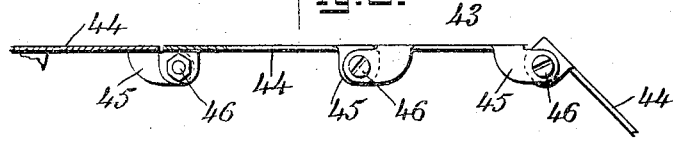
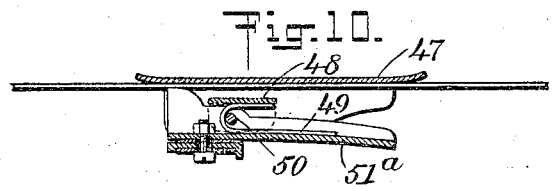
WITNESSES
INVENTOR
Jacob Barnett
BY
ATTORNEYS

UNITED STATES PATENT OFFICE.

JACOB BARNETT, OF NEW YORK, N. Y.

TAILOR'S MEASURING APPARATUS.

No. 855,272.

Specification of Letters Patent.

Patented May 28, 1907.

Application filed July 19, 1906. Serial No. 326,855.

*To all whom it may concern:*

Be it known that I, JACOB BARNETT, a citizen of the United States, and a resident of the city of New York, borough of Manhattan, in the county and State of New York, have invented a new and Improved Tailors' Measuring Apparatus, of which the following is a full, clear, and exact description.

This invention relates to measuring apparatus such as employed by tailors in taking measurements for cutting garments. The apparatus is intended to be used especially in taking the measurements at the upper part of the body and particularly at the shoulders.
While the invention is intended primarily to provide means for taking accurate measurements at the shoulders, it affords means for taking measurements at other points.

The invention consists in the construction and combination of parts to be more fully described hereinafter and particularly set forth in the claims.

Reference is to be had to the accompanying drawings forming a part of this specification, in which similar characters of reference indicate corresponding parts in all the figures.

Figure 1 is a front view illustrating the manner in which the apparatus is applied to the body; Fig. 2 is a rear view showing the apparatus applied to the body; Fig. 3 is a diagram showing the manner in which the pattern is laid out; Fig. 4 is a view representing the apparatus detached from the body, certain parts being broken away; Fig. 5 is a section on the line 5—5 of Fig. 4 and illustrating certain details of the construction; Fig. 6 is a section taken substantially on the line 6—6 of Fig. 4 and illustrating details of the construction; Fig. 7 is a section on the line 7—7 of Fig. 4 and also illustrating details of the construction; Fig. 8 is a side elevation showing the apparatus folded up into a compact form; Fig. 9 is an edge view of a metallic tape which constitutes a feature of the invention, and illustrating a modified construction thereof; and Fig. 10 is a longitudinal sectional view through a clamp of a modified form which may be used instead of other clamps to be described more fully hereinafter.

Referring more particularly to the parts, and especially to Figs. 1 to 4, 1 represents a horizontal bar which is adapted to be applied in a horizontal position, as indicated in Fig. 2, at the back of the body. To the ends of this bar straps 2 are attached which are adapted to be passed forwardly under the arm pits, then upwardly and rearwardly over the shoulders, as shown. These straps are provided with a plurality of openings 3 which enable them to be adjustably attached to the bar 1, for which purpose said bar is provided with a pair of hooks 4 as indicated in Fig. 4. Attached at right angles to this bar 1, I provide a back scale 5 which extends vertically downward below the bar 1 and also projects a short distance thereabove as indicated. Near the point of attachment between the back scale 5 and the bar 1, I provide a blade measure scale I; this scale I is pivotally attached at 6 to the back scale 5. It may extend in either direction from the back scale; as indicated in Fig. 2 it extends toward the right, it being supposed that the measurements are to be taken on this side. This scale extends forwardly under the right arm pit and forwardly along the right breast of the model, as indicated in Fig. 1.

Slidably mounted on the scale I, I provide a clamp 7 to which there is attached, upon a pivot 8, a side scale 9, and this side scale normally hangs vertically downward at the side of the model under the arm as shown in Figs. 1 and 2. On the same pivot 8 I provide an upwardly extending blade 10 which may occupy the position shown in Fig. 4 or which may be folded down into alinement with the scale I. The clamp 7 carries a scale IV which is superposed upon the scale I. The divisions of this scale correspond to the scye measures of different models. Beyond this scale IV the extremity of the scale I is provided with an opening 11 which is adapted to receive a hook 12 on the end of a strap 13, which strap is adapted to pass across the left breast, as indicated in Fig. 1, and is detachably connected at 14 to the left strap 2. At the upper extremity of the back scale 5 a blade 15 is pivotally attached at 16, and this blade is formed of hinged plates 17. On the upper edge of this blade 15 a scale II is provided, and on the lower edge a scale III. These scales are numbered from the point 16, and the distance between the divisions on the scale II is two-fifths of an inch, while those on the scale III are four-fifteenths of an inch. These divisions correspond to models of different sizes. The numbers on the scale IV measure from the pivot point 8, and these divisions are one-third of an inch apart.

The divisions correspond to models of different sizes. The divisions on the scale I number from the point 6, and these divisions are three-fifths of an inch in length. The scales 5 and 9 are formed with a plurality of hinged plates 18, and the scale I is similarly formed with a plurality of connected plates 19.

In using the device to take the measures at the right shoulder, the device is applied as indicated in Figs. 1 and 2. The clamp 7 will be slid along and placed just forwardly of the arm, so that the blade 10 engages the forward side of the arm, as indicated in Fig. 1. A measurement is then taken from the back of the collar at the point 20, extending vertically downward to the point 6. This measure gives the scye depth. The reading on the blade scale is then taken at the point 21ᵃ to give the blade measure; this is the distance from the middle of the back, and is about three-fifths of the half chest; in a thirty-five inch chest this blade measure should read seventeen and one-half on scale I. Assuming that the scye measure is nine inches, the number nine will then be sought on the scale IV on the right breast. This number will be found near the point 21 as indicated in Fig. 1. From this point 21 I take three shoulder measures, A, B and C. The first shoulder measure extends from the point 20 around the side of the collar down to the point 21, and measures the distance between the points 20 and 21. In order to take the measure B, one half the chest measure of the model is ascertained. Assuming that this is seventeen and a half inches, I then find the number seventeen and a half on the scale III. The measure B is then taken from the point 21 to this point 22 as indicated in Fig. 2. In order to take the measure C, I find the number seventeen and a half on the scale II, and the measure C is then taken from the point 21 to the point 23, as indicated in Fig. 2.

The manner of using these three measures A, B and C and laying out the pattern, will be described more fully hereinafter.

At this point, attention is called to the reversibility of the entire apparatus. By reason of the pivotal connection between the blade scale I and the back scale 5, I am enabled to change this scale over to the left hand side. The blade 10 will then be rotated on its pivot 8 so as to project upwardly, and the side scale 9 will be likewise reversed so as to extend downwardly on the left hand side. The blade 15 having the scales II and III will then be reversed upon its pivot 16. In this way the entire apparatus is changed from a right hand to a left hand one, so that similar dimensions may be taken on the left shoulder. The waist measures may be taken along the scales 5 and 9. By reason of the hinge connections or points between the blades of these scales 5 and 9, the scales are enabled to hang close to the body so as to conform to the figure thereof. In this way I am enabled to give the waist any desired fullness. The length of the waist is, of course, measured on these scales.

The clamp 7 is very clearly illustrated in Fig. 7; it comprises a saddle 24 which is adapted to be slid along on a scale and which may be held in any position thereupon by means of a clamping shoe 25 which is pivotally attached at 26 and formed with toes 27 which are pressed against the side of the scale by a spring 28 as shown. The side scale 9 is not attached directly to the clamp, but is attached upon a seat plate 29 having a flange 30 on the vertical edge thereof, and this flange affords means for enabling the scale to hang in a vertical position. In this connection it should be understood that when the scale 9 is reversed, it is turned toward the left as viewed in Fig. 4. As indicated in Fig. 7, the scale IV is attached to the clamp 7 upon a suitable transverse pivot pin 31. The back scale 5 is not attached directly to the bar 1, but is attached to a clamp 32 which is adapted to slide on the bar so as to adjust the same thereupon. The construction of this clamp is shown in Fig. 6. It comprises a saddle 33 which slides on the bar, and is provided with a clamping shoe 34 pressed toward the bar by a spring 35, the said shoe being pivotally mounted on a transverse pin 36. To the scale 5 adjacent to this clamp, the aforesaid blade scale I is pivotally attached at the point 6 in the manner described above.

The clamp 32 is formed rigidly with the clamp 37, which clamp is disposed in a vertical position, as indicated in Fig. 4, and affords means for adjustably attaching the scale 5, this scale being arranged to slide vertically therethrough. The construction of this clamp 37 is very clearly shown in Fig. 5; it is formed with a saddle 38 through which the scale 5 slides, a shoe 39 being provided which is pressed against the scale by a spring 40, the said shoe being pivoted at 41 as shown. In this way the elevation of the blade scale I and the blade 15 may be adjusted, after the strap 2 and the bar 1 have been attached in position. The upper extremity of the scale 5 is bent over so as to form a flange 42, and this flange operates as a stop to hold the blade 15 in a horizontal position on either side of the scale 5. In order to reverse the blade 15, it will be rotated downwardly. This blade is reversed in order to take the dimensions on the other shoulder in the manner suggested above.

When the apparatus has been removed from the body, it may be compactly folded up in the manner illustrated in Fig. 8, the hinge plate connections affording means for rolling up the scales 5 and 9. All of the scales can be brought into substantial alinement by reason of the pivotal connections between them. Instead of employing a simple hinge connection between the plates at which the scales are employed, I may adopt the construction shown in Fig. 9. In this view I show a scale 43 composed of plates 44, and these plates are formed at their extremities with integral laterally projecting ears 45 which are connected by clamping bolts 46. These bolts may be made tight or loose so as to make the scale more or less flexible.

Instead of using clamps of the general construction described above, I may form the clamps in the manner illustrated in Fig. 10. This modification consists in providing a saddle 47 with an inwardly projecting wing 48 which is punched from the material on the side of the saddle, and this wing operates to assist in holding the spring 49 in position, which spring is bent around the pivot pin 50 and thrusts against the inner side of a clamping shoe 51.

In laying out the pattern, I start at the point $51^a$ as illustrated in Fig. 3, and measure vertically down to a point 52, a distance equal to the scye dimension referred to above, that is, the distance between the points 6 and 20, in Fig. 2. I then lay off 52—53 equal to the blade measure; then 52—54 equal to one-third of $51^a$—52; then I lay off 53—55 equal to one-third the scye depth; 54—56 is then laid off, equal to two-fifths of the half chest; 56—57 is then made one-third of 56—54. The point 58 is then taken on a vertical line one-third of the distance from 54 to 56, and the distance $51^a$—58 is made equal this amount, plus a half inch. I then draw in the shoulder line 58—59. Take the point 60 vertically above 55 and on the horizontal line passing through $51^a$. Lay off 60—61 equal 58 to 59. Take point 62 at middle of this line. Then I lay off 55—63 equal to measure A; 55—64 equal to measure B, and 55 to 65 equal to measure C. $51^a$ to 58 equal 60—63, 64—69 equal to 57—67, and lay off 65—68 equal 56—66. Then I draw the shoulder line through 60, 69 and 68.

Having thus described my invention, I claim as new and desire to secure by Letters Patent:

1. In apparatus of the class described, in combination, a back scale, a blade scale pivotally attached thereto and adapted to extend forwardly under the arm of the model, a second scale adjustably mounted on said blade scale and having means for alining the same with respect to the forward side of the arm of the model, said second scale having dimensions thereupon corresponding to the scye measures, and a third scale attached to said back scale in a substantially horizontal position above said blade scale and having divisions thereupon corresponding to models of different sizes.

2. In apparatus of the class described, in combination, a strap adapted to be passed around the body below the arm pits, a bar attached to said strap at the back, a back scale carried by said bar, a blade scale pivotally attached to said back scale and adapted to extend forwardly under the arm, a second scale adjustably attached to said blade scale and adapted to be positioned forwardly of the arm of the model, and a third scale pivotally attached to said back scale and extending horizontally across the shoulder blade of the model, said second scale having divisions thereupon corresponding to the scye measures of different models, said last scale having divisions thereupon corresponding to models of different sizes.

3. In apparatus of the class described, in combination, a back scale, means for attaching the same in a vertical position on the back of the model, a blade scale pivotally attached to said back scale and extending forwardly under the arm pit of the model, a second scale adjustably mounted on said blade scale, and a third scale pivotally attached to said back scale at a point above said blade scale.

4. In apparatus of the class described, in combination, a strap adapted to be attached to the model, a blade scale attached to said strap at the back and adapted to extend forwardly under the arm of the model, a second scale adjustably attached to said blade scale and having divisions thereupon corresponding to the scye measures of different models, and a second scale attached in a horizontal position above said blade scale and having divisions thereupon corresponding to models of different sizes, said last divisions coöperating with said second scale to take shoulder measures.

5. In apparatus of the class described, in combination, a back scale, means for attaching the same to the model at the back, a blade scale attached to said back scale and extending forwardly under the arm pit of the model, a clamp adjustably mounted on said blade scale, a side scale depending from said clamp, said back scale and said side scale being formed with plates jointed together whereby they may conform to the figure of the model.

6. In apparatus of the class described, in combination, a bar, a strap attached thereto and adapted to secure said bar at the back of the model in a substantially horizontal position, a back scale adjustably attached to said bar, a blade scale pivotally attached to said back scale and extending forwardly under the arm pit of the model, a clamp adjustably mounted on said blade scale, a second scale carried by said clamp and having divisions thereupon corresponding to the scye measures of different models, a side scale depending from said clamp, said side scale and said back scale being composed of plates jointed together, said back scale extending above said bar, and a third scale pivotally attached to the upper extremity of said back scale and extending substantially horizontally across the back of the model, said last scale having divisions thereupon corresponding to models of different sizes.

In testimony whereof I have signed my name to this specification in the presence of two subscribing witnesses.

JACOB BARNETT.

Witnesses:
F. D. AMMEN,
JNO. M. RITTER.